(12) United States Patent
Ohashi

(10) Patent No.: US 6,278,803 B1
(45) Date of Patent: Aug. 21, 2001

(54) INTERPOLATION APPARATUS FOR OFFSET SAMPLING SIGNALS

(75) Inventor: Kazuhito Ohashi, Yokohama (JP)

(73) Assignee: Canon Kabushiki Kaisha

( * ) Notice: Subject to any disclaimer, the term of this patent is extended or adjusted under 35 U.S.C. 154(b) by 0 days.

(21) Appl. No.: 08/455,667

(22) Filed: May 31, 1995

Related U.S. Application Data

(63) Continuation of application No. 08/257,938, filed on Jun. 10, 1994, now abandoned, which is a continuation of application No. 08/020,260, filed on Feb. 18, 1993, now abandoned, which is a continuation of application No. 07/690,655, filed on Apr. 24, 1991, now abandoned.

(30) Foreign Application Priority Data

| Apr. 26, 1990 | (JP) | 2-114596 |
|---|---|---|
| Apr. 26, 1990 | (JP) | 2-114597 |
| Apr. 26, 1990 | (JP) | 2-114598 |

(51) Int. Cl.$^7$ .................................................. G06K 9/40
(52) U.S. Cl. ......................................................... 382/254
(58) Field of Search .......................... 340/728; 348/390, 348/441, 415, 416, 616, 571, 424, 425, 431, 443; 358/428, 456, 500; 382/276, 293, 298, 254

(56) References Cited

U.S. PATENT DOCUMENTS

| 4,578,812 | * | 3/1986 | Yui ........................................ 382/47 |
|---|---|---|---|
| 4,651,207 | * | 3/1987 | Bergmann et al. ................... 348/415 |
| 4,692,801 | * | 9/1987 | Ninomiya et al. .................... 348/425 |
| 4,703,353 | * | 10/1987 | David ..................................... 382/47 |
| 4,745,459 | * | 5/1988 | Ninomiya et al. .................... 348/431 |
| 4,833,531 | * | 5/1989 | Abe et al. .............................. 382/47 |
| 4,872,064 | * | 10/1989 | Tutt et al. ............................. 358/456 |
| 4,893,188 | * | 1/1990 | Murakami et al. ................... 358/456 |
| 4,907,031 | * | 3/1990 | Okamura et al. ..................... 348/390 |
| 4,912,568 | * | 3/1990 | Shimano ............................... 358/456 |
| 4,967,264 | * | 10/1990 | Parulski et al. ....................... 358/500 |
| 4,979,037 | * | 12/1990 | Mizutani et al. ..................... 348/424 |
| 5,001,575 | * | 3/1991 | Nakahara .............................. 358/428 |
| 5,027,209 | * | 6/1991 | Nishimura et al. ................... 348/616 |
| 5,054,100 | * | 10/1991 | Tai ......................................... 382/47 |
| 5,070,403 | * | 12/1991 | Wilkinson ............................ 348/441 |
| 5,126,843 | * | 6/1992 | Tanaka ................................. 348/441 |
| 5,136,379 | * | 8/1992 | Ishii ...................................... 348/443 |
| 5,144,427 | * | 9/1992 | Kitaura et al. ....................... 348/424 |
| 5,166,794 | * | 11/1992 | Tanaka ................................. 348/616 |
| 5,251,271 | * | 10/1993 | Fling .................................... 382/44 |
| 5,268,758 | * | 12/1993 | Nakayama et al. .................. 348/571 |

\* cited by examiner

Primary Examiner—Jose L. Couso
(74) Attorney, Agent, or Firm—Robin, Blecker & Daley

(57) ABSTRACT

Interpolation apparatus for offset sampling of signals comprises a plurality of interpolation circuits whose interpolation methods are different from each other and a selection circuit which selects one of outputs of the interpolation circuits according to the degree of correlation between a group of pixels located in the surrounding area of an interpolation pixel and another group of pixels located in the surrounding area of the group of pixels.

33 Claims, 12 Drawing Sheets

INTERPOLATION PIXEL

INTERPOLATION PROCESSING

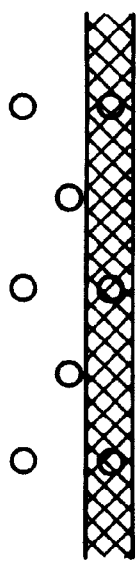
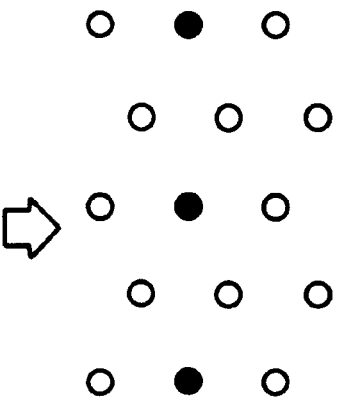
FIG. 5A — OFFSET SAMPLING HORIZONTAL LINE PORTION NOT BAND-LIMITED SUFFICIENTLY
FIG. 5B
FIG. 5C — INTERPOLATE PIXEL □ BY NEIGHBORING PIXELS TURNING BACK DISTORTION IS GENERATED

VERTICAL LINE PORTION

HORIZONTAL LINE PORTION

CASE EXCEPT VERTICAL AND HORIZONTAL LINE PORTIONS

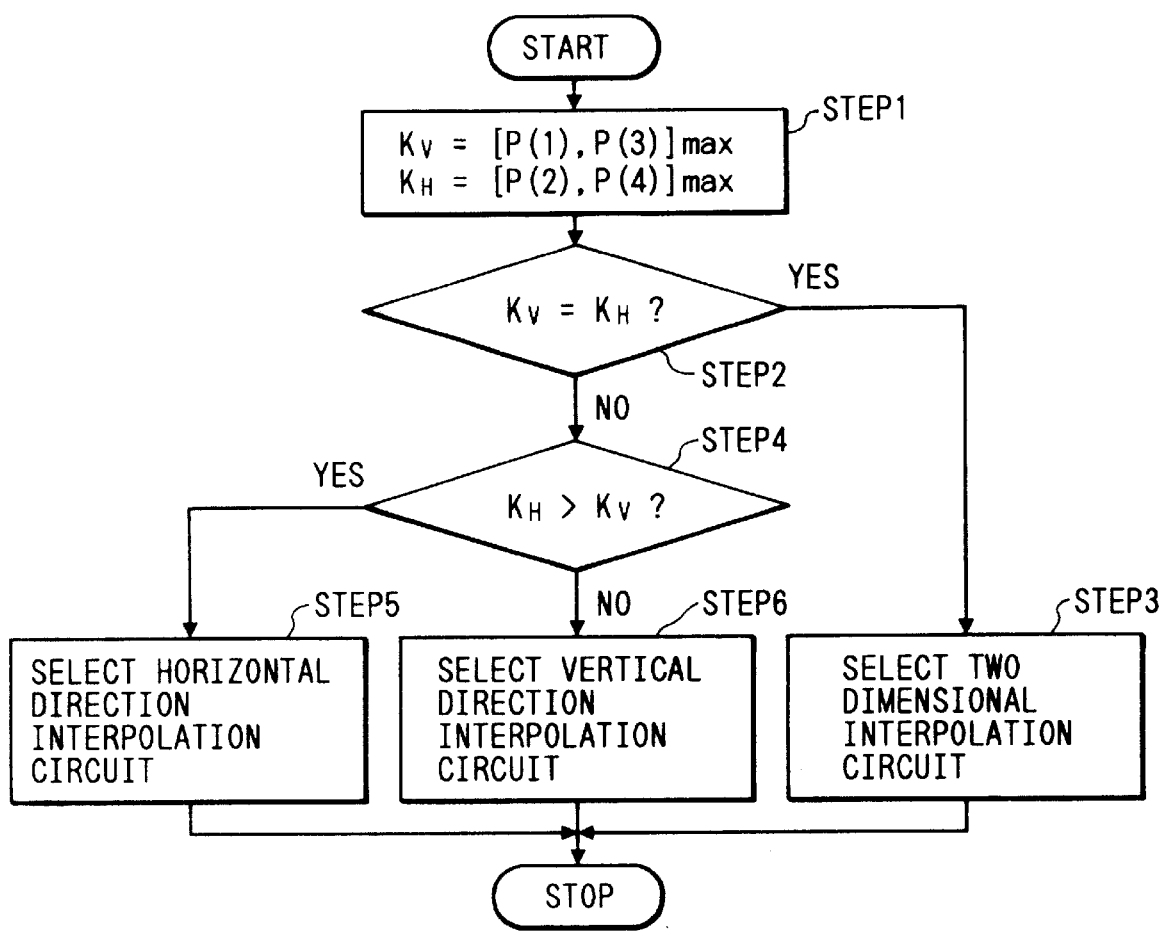

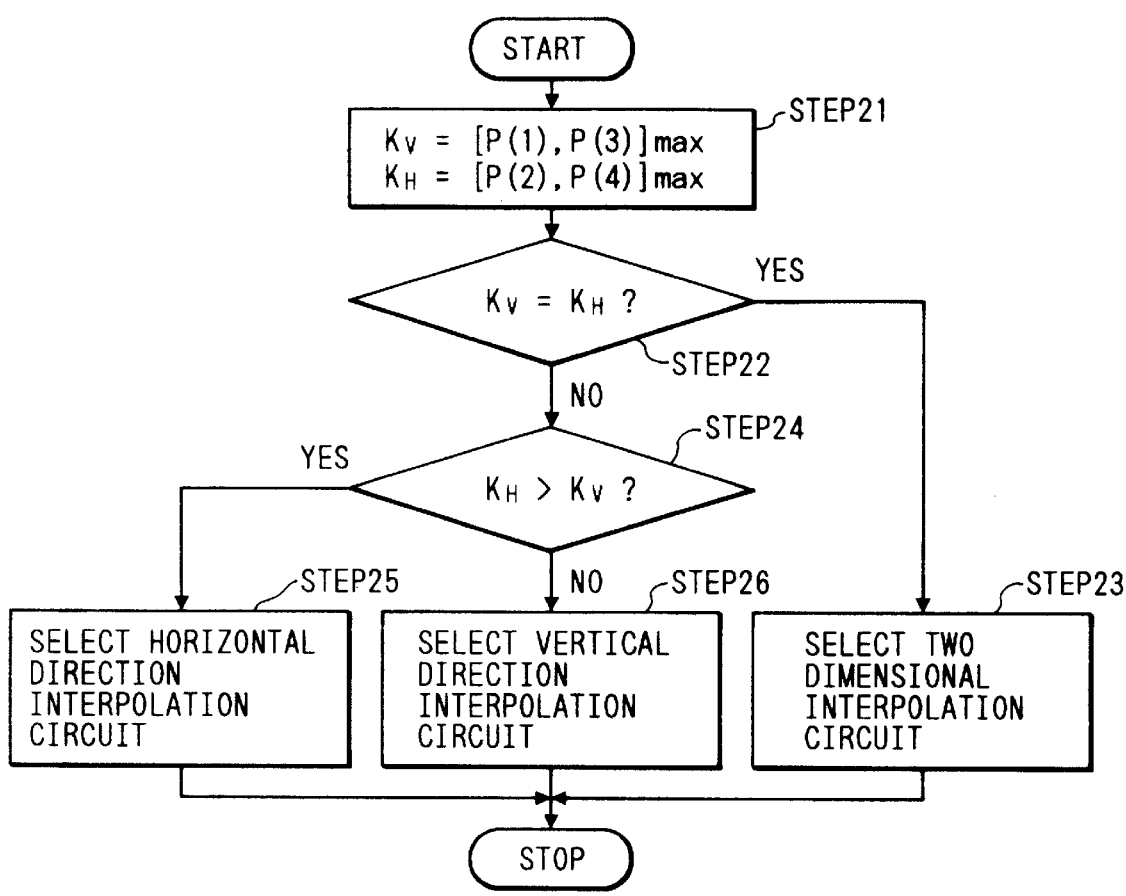

INTERPOLATION APPARATUS FOR OFFSET SAMPLING SIGNALS

This is a continuation application under 37 CFR 1.62 of prior application Ser. No. 08/257,938, filed Jun. 10, 1994, now abandoned whch is a continuation of Ser. No. 08/020,260, filed Feb. 18, 1993, abandoned, which is a continuation of Ser. No. 07/690,655, filed Apr. 24, 1991, abandoned.

BACKGROUND OF THE INVENTION

1. Field of the Invention

The present invention relates to an interpolation equipment for pictorial signals, etc., which have been obtained by offset sampling.

2. Related Background Art

Conventionally, a method called offset sampling has been known as a method to compress the band or reduce information amount in the recording and transmission of various kinds of information signals such as image signals.

This offset sampling, in the case of two dimensions, is such that as shown in FIG. 1, the sampling interval (Tx, Ty) between the horizontal direction (x direction) and the vertical direction (y direction) is set twice the pixel interval at the original signals (Hx, Hy) and at the same time the adjacent points of sampling in the vertical direction are offset by one-half the sampling interval (Tx/2). The transmission band by the offset sample can be made wider, as shown in FIG. 2, in terms of spatial frequency component in the horizontal or vertical direction against the spatial frequency of a diagonal direction. Also, in case the image signal of the above offset sampling is displayed on the monitor or printed out, it is necessary, as shown in FIG. 3, to give interpolation processing for interpolating pixels at each sampling point (interpolation pixel) with adjacent pixels. Such interpolation processing functions as a spatial filter which allows the passing of frequency components in the shaded part of FIG. 2 and also inhibits the passing of frequency components in the area containing a turning back point A. This interpolation processing is positioned as in after-filter in the sampling theory.

Meanwhile, such an offset sampling as mentioned above is a very effective method if the prefilter before the sampling is correctly positioned, namely if a sufficient band limitation is made. However, if the pre-filter positioning is not appropriate owing to, for example, hardware limitation or if the pre-filter is not given thoroughly to widen the transmission band, there arises a problem of image deterioration owing to the generation of turning back distortion.

In other words, if the offset sampling is made when the pre-filter is insufficient, the high-area component of the original signal in the horizontal direction, as shown in FIG. 4A, turns back as a high-area component of the vertical direction and at the same time, as shown in FIG. 4B, the high-area component of the vertical direction turns back as the high-area component of the horizontal direction.

For this reason, the offset sampling is made as shown in FIG. 5B without sufficient band limitation of pictures containing the linear portion as shown in FIG. 5A. Even if the above-mentioned interpolation processing is made to the sampling signal containing this turning-back component, the high-area component at the original signal and the high-area component of the turning back cannot be separated, so that the turning-back distortion cannot be removed entirely. Thus, there arises uneveness of shade or blot on the linear part as shown in FIG. 5C, resulting in pictorial deterioration of an output picture.

Accordingly, an adaption-type interpolation method has generally been known as a method to mitigate the generation of the above turning-back distortion.

This adaption-type interpolation method detects, in the interpolation processing of the sampled image signals, whether the interpolation should be started with the pixels of the horizontal direction, whether it should be the pixels of the vertical direction or whether all of the surrounding pixels should be interpolated. Based on the result of this detection, spatial filters having such characteristics as shown in FIGS. 6A–6C are used selectively to remove unnecessary turning-back components. In this event, if the interpolation pixels are those constituting the linear line of the horizontal direction, filters having such characteristics shown in FIG. 6A as allowing more frequency components of the horizontal direction to pass through, are used to filter (remove) frequency components of the vertical direction containing turning-back components.

Incidentally, in the case of the above adaption-type interpolation method, the accuracy of judgment to select interpolation means determines the performance of the interpolation equipment.

In other words, if the occurrence of false judgment has high probability, there was a problem in that the interpolation processing based on false detection not only reduced original signal components but also resulted in the increase of turning-back distortion.

SUMMARY OF THE INVENTION

The present invention has been made in view of the above circumstances and seeks to offer the interpolation equipment of the offset sampling signals which allows the prevention of the generation of turning-back distortion by detecting accurately the "tendency" of surrounding pixels centering on interpolation pixels.

To attain this objective one embodiment of the present invention offers interpolation apparatus for offset sampling signals, comprising a plurality of interpolation means having different interpolation methods respectively and selection means for selecting one of outputs of the plurality of interpolation means according to degree of correlation between a group of pixels consisting of pixels located in the surrounding area of an interpolation pixel and a plural number of other groups of pixels located in the surrounding area of the pixel group.

According to the above embodiment, it becomes possible to conduct interpolation processing, on the basis of accurate judgment of the "tendency" in the pixels interpolation pixels by selecting interpolation means according to the correlation between a group of pixels comprising pixels located in the surrounding area of interpolation pixels and a plural number of other groups of pixels located in the surrounding area of the pixel group.

By so doing, the occurence of turning-back distortion based on the traditional false judgment can be prevented. Consequently, the occurence of deterioration of image quality resulting from the turning-back distortion can be prevented.

Furthermore, to attain this objective, another embodiment of the present invention provides interpolation apparatus for offset sampling, comprising selection means to select one of outputs of the plurality of interpolation means according to degree of correlation between a group of pixels comprising pixels located in the surrounding area of the interpolation pixel and a plural number of other group of pixels located in the surrounding area of the pixel group and a distribution area of each level at a plural number of pixels located in the surrounding area of the interpolation pixel.

According to the present Embodiment it is possible to conduct interpolation processing based on the result of accurate judgment of the "tendency" in the surrounding of interpolation pixels by selecting interpolation means according to the degree of correlation between a group of pixels comprising pixels located in the surrounding area of interpolation pixels and a plural number of other groups of pixels located in the surrounding area of the pixel group.

Consequently, the occurence of turning-back distortion based on the traditional false judgment can be prevented. Thus, the occurence of deterioration of image quality originating from turning-back distortion can be prevented.

Besides, the present invention allows it to detect the "tendency" of changes in the surrounding pattern of interpolation pixels by detecting the distribution range of levels of each pixel data and, based on the result of the detection, to attain interpolation processing which is unlikely to provide false judgment by making at one time the interpolation output on the basis of all surrounding pixels of interpolation pixels of level fluctuation being small.

To achieve this objective, another embodiment of the present invention provides interpolation apparatus for offset sampling of signals comprising a plurality of interpolations means whose interpolation methods are different from each other, and selection means which detects the correlation degree between a group of pixels comprising pixels located in the surrounding area of the interpolation pixel and a plural number of other group of pixels located in the surrounding area of the pixel group, based on each pixel data treated with n values (n is an integer of 2 or more) of each pixel group and selects, based on the result of the detection, one of outputs of the plurality of interpolation means.

According to the present embodiment of the said structure, it is possible to conduct interpolation processing on the basis of the result of accurate judgment of the "tendency" in the surrounding area of interpolation pixels by selecting interpolation means according to the degree of correlation between a group of pixels comprising pixels located in the surrounding area of interpolation pixels and a plural number of other groups of pixels located in the surrounding area of the pixel group.

By so doing, the occurence of turning-back distortion based on the traditional false judgment can be prevented. Consequently, deterioration of image quality resulting from the turning-back distortion can be prevented.

Also, the present invention makes it possible to simplify the operation for calculation of the degree of correlation by obtaining the said degree of correlation based on the n-value data of supplied pixels and eventually speed the processing and make the size of hardware smaller.

Another purpose and characteristics of the present invention will become evident from the drawings and specifications which follow.

BRIEF DESCRIPTION OF THE DRAWINGS

FIGS. 5A–5C show examples of generation of turning-back distortion.

FIG. 9 is a flow chart showing the operation of the embodiment shown in FIG. 1.

FIG. 14 is a flow chart indicating the operation of the embodiment shown in FIG. 13.

DETAILED DESCRIPTION OF THE PREFERRED EMBODIMENT

Figure 10:
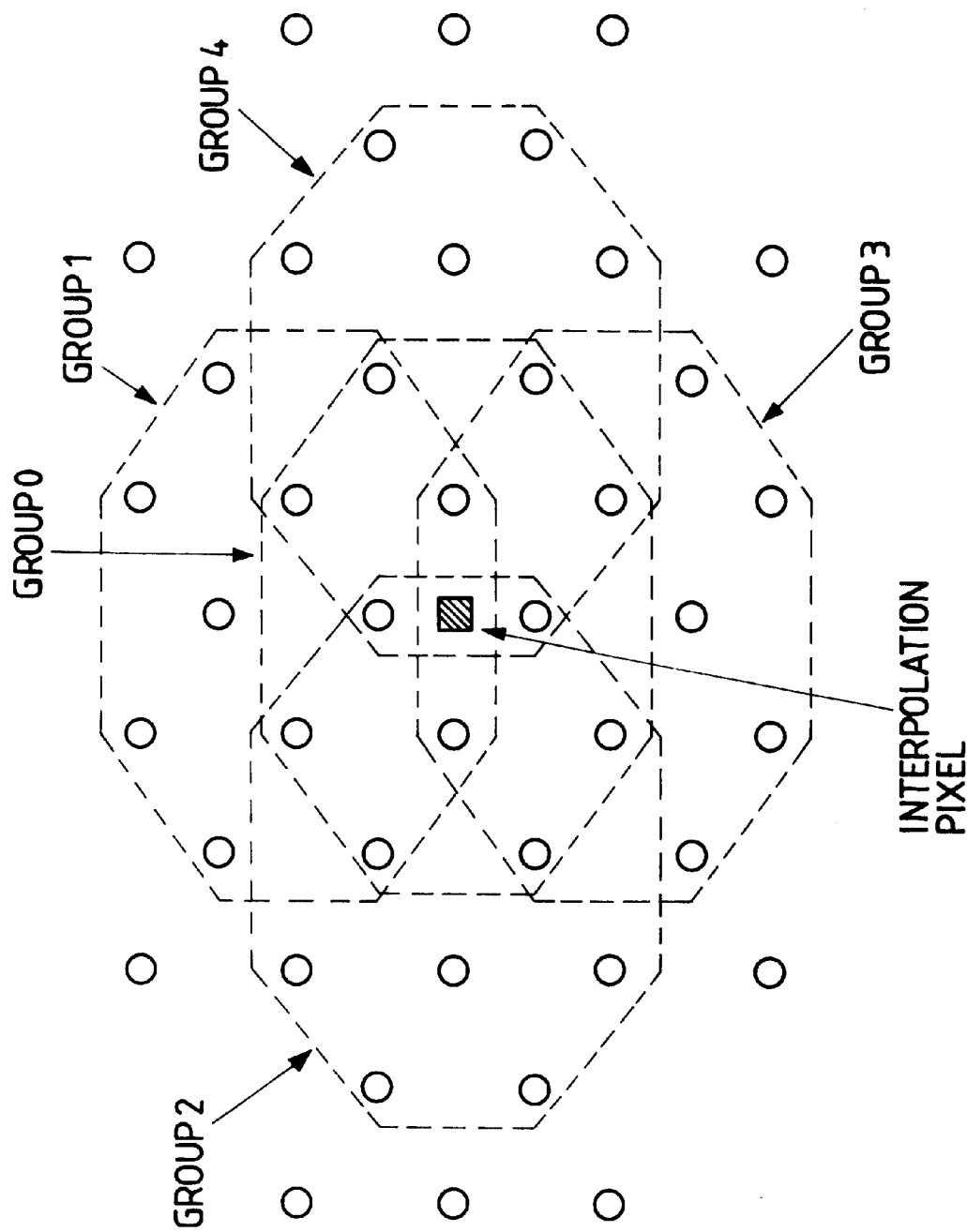
FIG. 10 is a pixel layout showing other relationships between a group of interpolation pixels and adjacent pixels and a group of the surrounding pixels.

Below given is a detailed explanation about a preferred embodiment of the interpolation equipment of the offset sampling signal relating to the present invention by the use of FIGS. 7 and 10.

Figure 1:
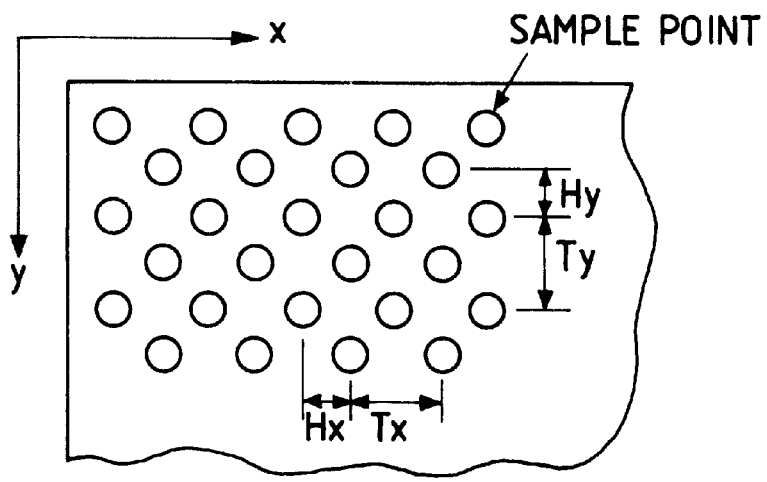
FIG. 1 shows the two-dimensional offset sampling structure.
Figure 2:
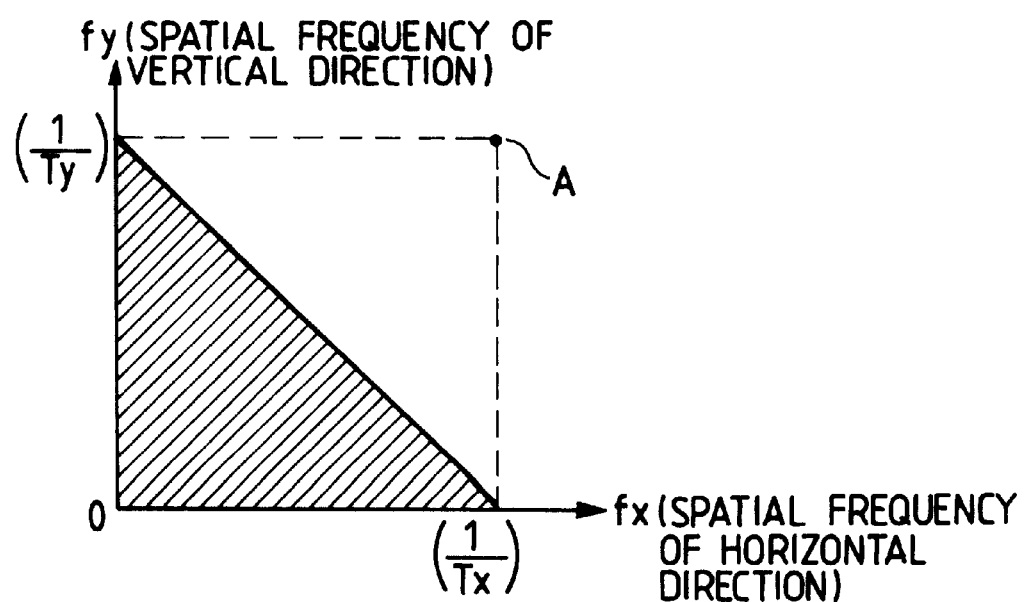
FIG. 2 shows spatial frequency spectrum of the band which is transmissible by the offset sampling.
Figure 3:
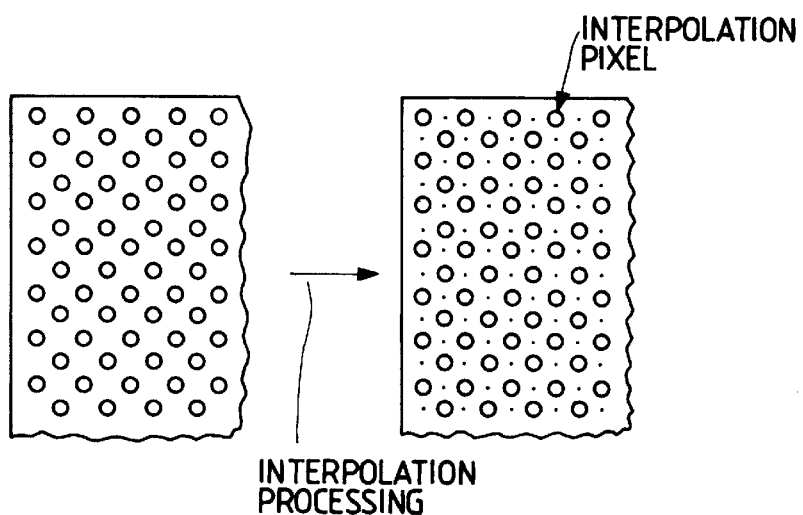
FIG. 3 illustrates the interpolation operation to restore the original signal from the sampling data.
Figure 4A:
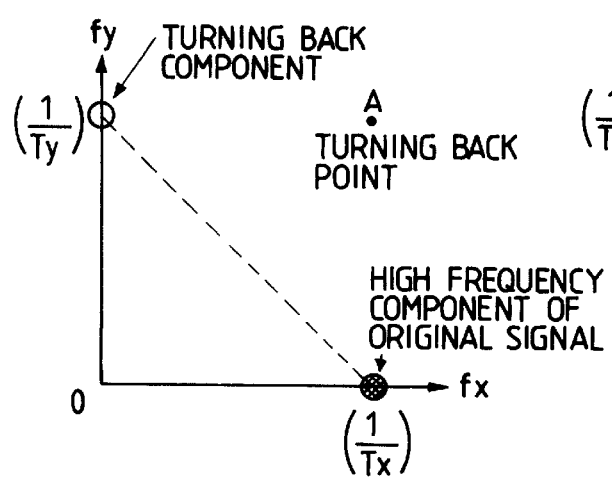
FIGS. 4A and 4B show spatial frequency spectra of turning-back components.
Figure 4B:
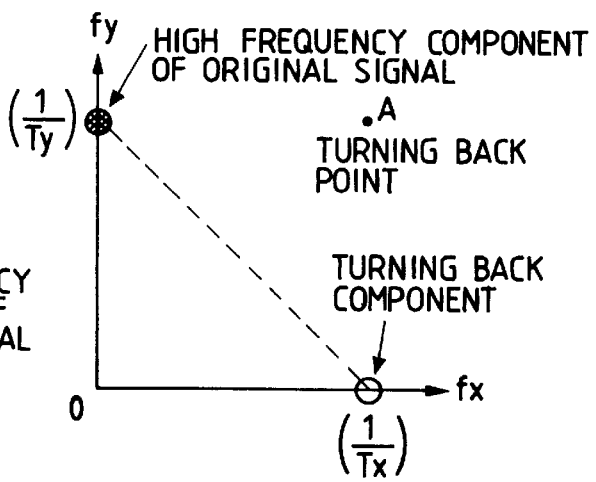
Figure 6A:
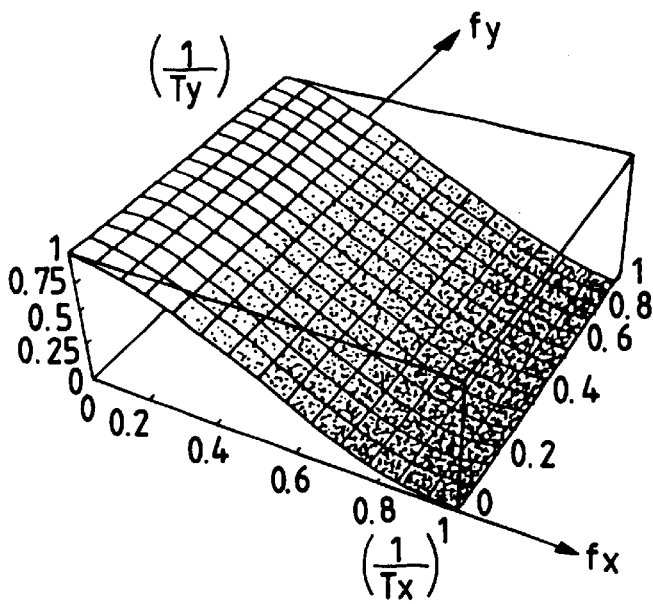
FIGS. 6A–6C show characteristics of interpolation circuits.
Figure 6B:
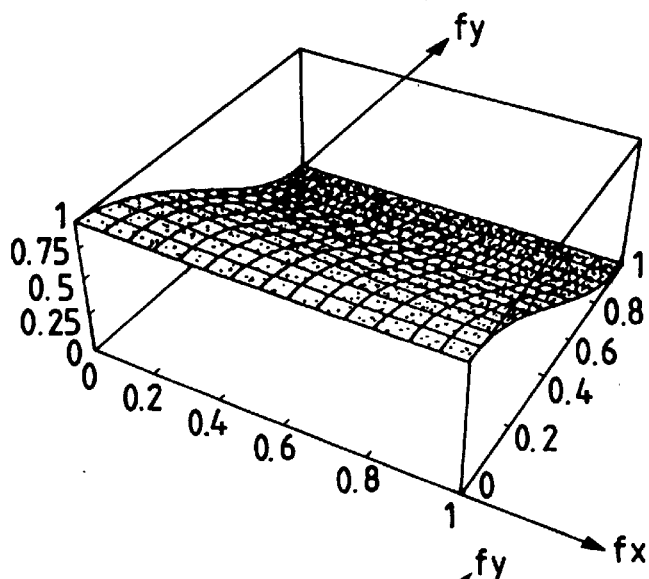
Figure 6C:
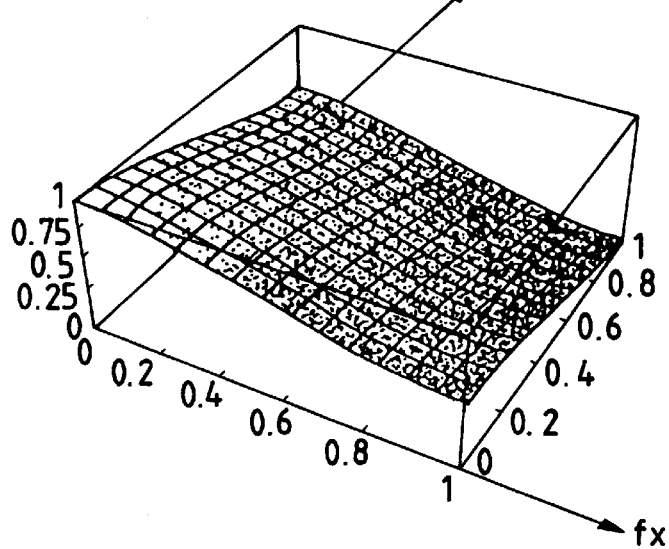
Figure 7:
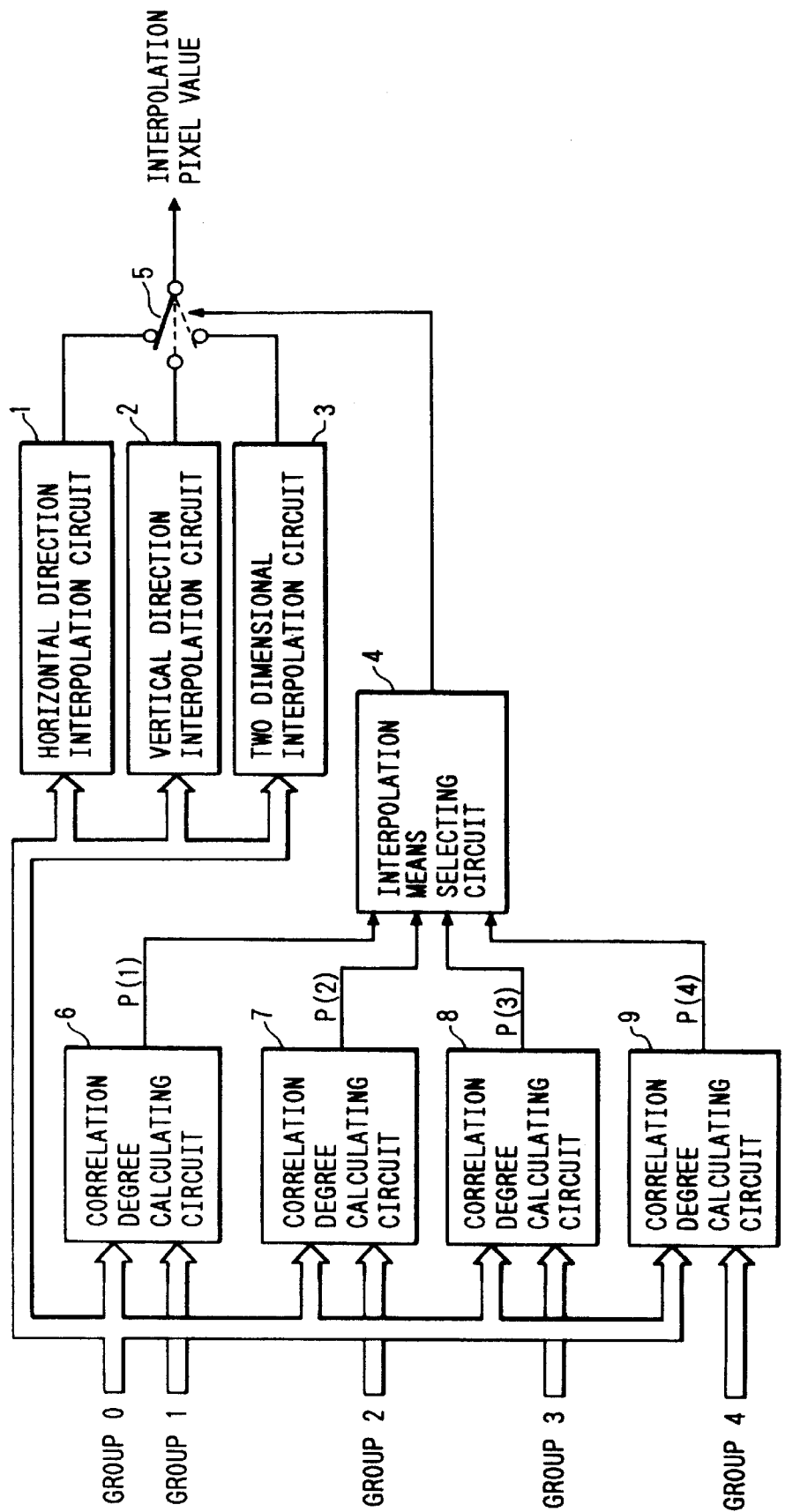
FIG. 7 is a block diagram showing the first embodiment of the present invention.
Figure 8B:
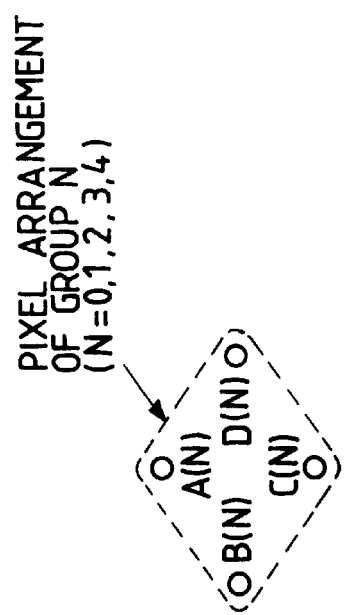
FIGS. 8A and 8B are pixel layouts showing relationship between a group of interpolation pixels and adjacent pixels and a group of surrounding pixels.
Figure 8A:
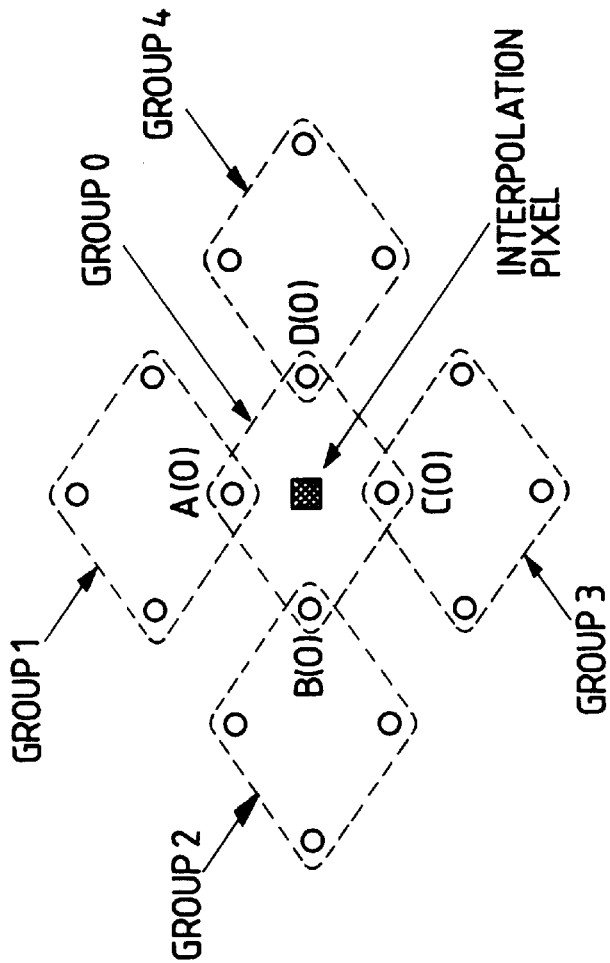

FIG. 7 is a block diagram showing the structure of the interpolation equipment of the present embodiment. FIGS. 8A and 8B are layout drawings of each pixel which is used to detect the "tendency" in the surrounding of the interpolation pixels in the present embodiment.

The present embodiment detects the degree of correlation between the four groups A (ø)–D (ø) in order to find out whether the pixel interpolation should be made from the pixel of the horizontal direction of whether the interpolation should be made from the pixel of the vertical direction or whether the interpolation should be made with all of the surrounding pixels by the use of not only the group of adjacent pixels comprising the four pixels A (ø)–D (ø) adjacent to the interpolation pixel in the horizontal direction and the vertical direction but also the groups 1–4 of the surrounding pixels comprising 4 pixels containing each signal pixel of the group ø.

In other words, each pixel data of the group ø of a specified bit (e.g. 12 bit) which is output from the A/D (analog-digital) Converter, etc., not shown in the drawing is supplied to each of a general horizontal-direction interpolation circuit 1, a vertical-direction interpolation circuit 2 and a two-dimentional interpolation circuit 3. In the above horizontal-direction interpolation circuit 1, based on each supplied pixel data (A, B, C, D) of the group ø the value of the interpolation pixel is obtained, for example, by the interpolation operation of (B+D)/2. Likewise, in the above vertical-direction interpolation circuit 2, based on the data of group ø of supplied pixels, the figure of the interpolation pixel is obtained by the interpolation operation of (A+C)/2, for example. Furthermore, in the two-dimensional interpolation circuit 3, based on the data of the group of supplied pixels, the figure of the interpolation pixels is calculated by the interpolation operation of (A+B+C+D)/4, for example.

Then, the interpolation pixel data thus calculated are supplied to the switch 5 controlled by the interpolation means selection circuit 4 which is explained later.

On the other hand, each pixel data of the above group ø is supplied to the correlation circuits 6, 7, 8 and 9 which calculate the degree of the first or the fourth correlation. To the circuit for the calculation of the first degree of correlation is supplied each pixel data of the above group 1. This first correlation degree calculation circuit calculates the degree of correlation between the group on the basis of the group ø of pixel data and the group 1 of pixel data, which are supplied. Likewise, to the second or fourth correlation degree calculation circuits 7–9 are supplied each pixel data of group 2 or group 4. The second correlation degree calculation circuit 7 calculates the correlation degree of the group ø and the group 2. The third correlation degree calculation circuit 8 calculates the correlation degree between the group ø and the group 3. The fourth correlation degree calculation circuit 9 calculates the degree of correlation between the group ø and the group 4. Then, the calculation output from each correlation degree calculation circuit P (1)–P (4) is supplied to the interpolation means selection circuit.

The correlation degree P (N) by the above correlation degree calculation circuits 7–9 in the present embodiment is calculated by the following formula.

$$P(N)=A(ø)\cdot A(N)+B(ø)\cdot B(N)+C(ø)\cdot C(N)+D(ø)\cdot D(N)$$

(N=1, 2, 3, 4)

The above-mentioned correlation degree calculation output P (N) is supplied to the interpolation means selection circuit 4, which, based on the output P (N), detects a group having the largest degree of correlation with the group and outputs the selection signal to select a specified interpolation means according to the detection results. In other words, as shown in FIG. 9, from among the supplied calculation output P (N), those having the largest correlation degree in the horizontal direction and the vertical direction respectively are detected (Step 1) to judge whether these are equal to each other or not (Step 2).

If they are equal, it is so judged that the interpolation method using all surrounding pixels is preferable. Then, such selection signal is selected that allows the output from the above switch 5 of those from the above two-dimensional interpolation circuit 3 (Step 3).

If they are not equal, comparison is made about the degree of correlation between the horizontal direction and the vertical direction (Step 4). If the correlation degree of the horizontal direction is larger, it is so judged that the pixel interpolation is preferable with adjacent pixels in the horizontal direction. Then, such a selection signal is output that allows the output through the switch 5 from the above horizontal direction interpolation circuit 1 (Step 5). If the degree of correlation of the vertical direction is larger, it is so judged that the pixel interpolation is preferable with adjacent pixels of the vertical direction. Then, such a selection signal is output that allows the output through the switch 5 from the above vertical-direction interpolation circuit 2 (Step 6).

Thus, since this embodiment allows the detection of correlation degree between a specified range containing pixels adjacent to interpolation pixels (a group of adjacent pixels and a group of surrounding pixels), it can be accurately judged whether the interpolation should be made with pixels of the horizontal direction or whether the interpolation be with the vertical direction or whether the interpolation should be with all of the surrounding pixels.

Based on such accurate judgment, the optimum interpolation processing is possible by selecting adjacent pixels, i.e., the interpolation circuits 1–3, which are used in the operation for the case in which the interpolation pixels are calculated from the operation based on adjacent pixel data.

For the above reason, in the present embodiment, there is a substantial lessening of the turning-back distortion originating from the false judgment. Thus, deterioration of image quality owing to the turning-back distortion can be prevented.

Based on the result of a simulation experiment conducted by the applicant of the present invention, it has become evident that the generation probability of false judgment in the present embodiment is extremely less than the conventional incidents.

Incidentally, while in the above embodiment, each group comprises 4 pixels, the present invention is not confined thereto. For example, as shown in FIG. 10, each group may consist of more pixels (in this event, 12 pixels) to give more accurate judgment.

In the present embodiment, explanation was made about the two-dimensional offset sampling. Actually, the present invention can apply to the interpolation equipment in which a three-dimensional picture such as animation is subjected to the offset sampling.

Furthermore, while in the above embodiment., the interpolation circuits 1–3 obtained interpolation pixels by using only those pixels adjacent to the interpolation pixels in the operation, surrounding pixels can be further used for this operation.

As evident from the above explanation, according to the present embodiment, the selection of the optimum interpolation means from a plural number of interpolation means to calculate and interpolate interpolation pixels from the offset-sampled signals was determined on the basis of the correlation degree of a plural number of pixel groups comprising pixels located in the surrounding area of the interpolation pixels. Accordingly, it has become possible to realize interpolation processing on the basis of accurate judgment of the "tendency" as to whether the interpolation pixels are those constituting the linear part of the horizontal direction, whether they are pixels constituting the linear part of the vertical direction or whether they are neither.

Accordingly, the present invention allows the prevention of generation of turning-back distortion resulting from false judgment of the "tendency" in the surrounding of the interpolation pixels, and hence the prevention of deterioration of image quality owing to the turning-back distortion.

Below given is a detailed explanation about a second embodiment of the offset sampling relating to the present invention with reference to FIGS. 11 and 12.

Figure 11:
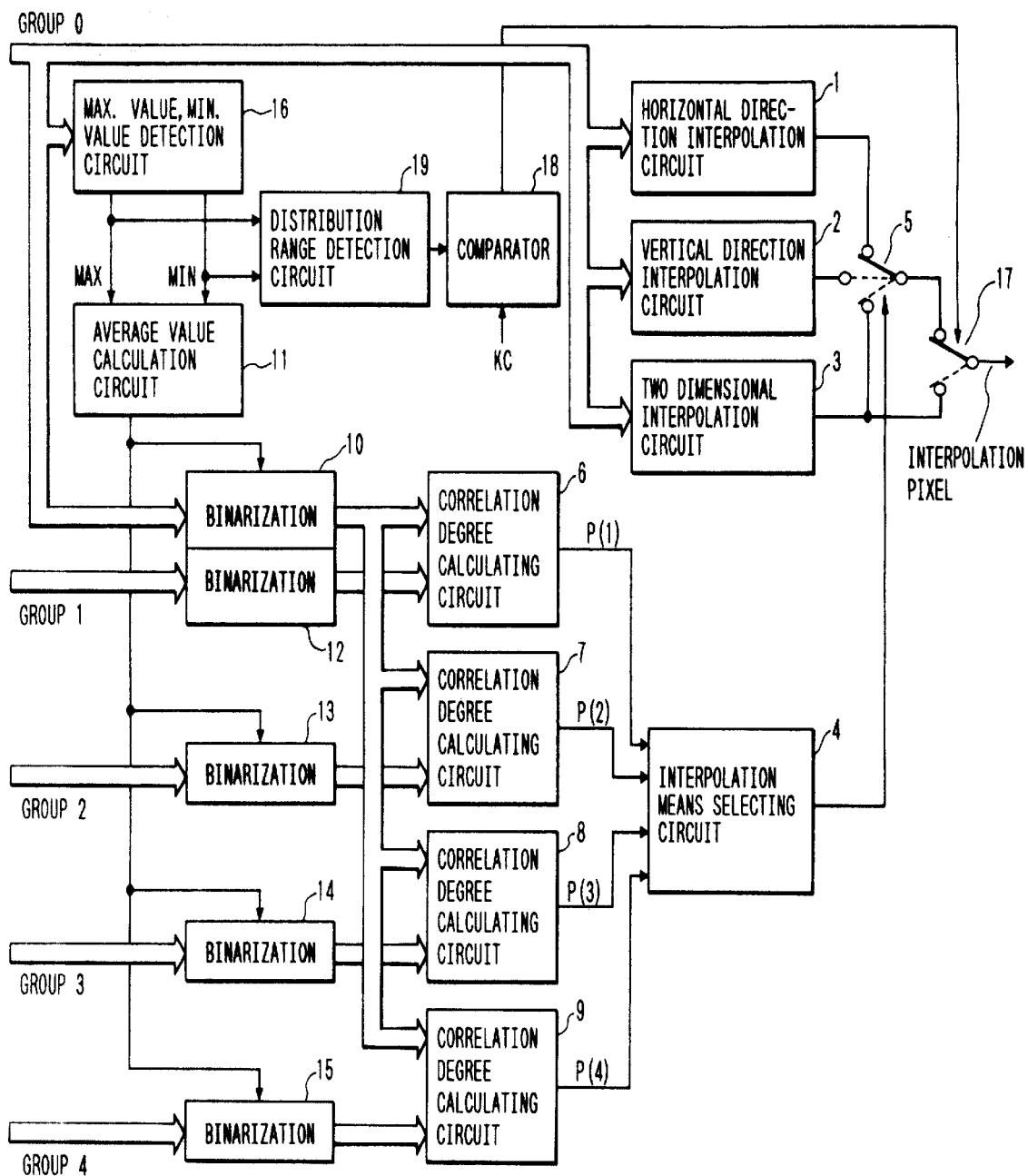
FIG. 11 is a block diagram showing the structure of the second embodiment relating to the present invention.

FIG. 11 is a block diagram showing the structure of the interpolation equipment of the present embodiment. The layout of each pixel which is used to detect the "tendency" in the surrounding area of interpolation pixels in the present embodiment is as shown in FIG. 8.

In the present embodiment, the degree of correlation between each of groups ø–4 is detected to see whether the pixel interpolation should be made with the pixels of the horizontal direction or whether the interpolation should be with pixels of the vertical direction or whether it should be with all of the surrounding pixels, using not only the group ø of adjacent pixel group comprising four pixels A (ø)–D (ø) adjacent to interpolation pixels of the horizontal and vertical directions but also the groups 1–4 of the surrounding pixels comprising 4 pixels containing each single pixel of this group ø.

In other words, each pixel data of the group ø of a specified bit (e.g., 12 bit) output from the A/D (analog-digital) converter, etc., is supplied to the general horizontal-direction interpolation circuit 1, the vertical-direction interpolation circuit 2 and the two-dimensional interpolation circuit 3. In the above horizontal-direction interpolation circuit 1, based on each pixel data of the group ø (A, B, C, D), a figure of the interpolation pixel is calculated by the interpolation operation of (B+D)/2, for example. Likewise, in the above vertical-direction interpolation circuit 2, based on each pixel data of the group ø, a figure of the interpolation pixel is calculated by the interpolation operation of (A+C)/2, for example. Furthermore, in the above two-dimensional interpolation circuit 3, based on each pixel data of the group ø, a figure of the interpolation pixels is calculated by the interpolation operation of (A+B+C+D)/4, for example.

The interpolation pixel data calculated as above are supplied to the first switch 5 which is switching-controlled by the later-mentioned interpolation means selection circuit 4.

Each of the pixel data of the above group ø is binarized in the binarization circuit 10 and is supplied to the first to the fourth correlation degree calculation circuits 6, 7, 8 and 9.

Each of the above binarization circuits 10 binarizes each of the supplied pixel data according to the average value (threshold value) supplied from the average value calculation circuit 11 which determines the average value based on the pixel data of the above group. The average-value calculation circuit 11 supplies the value data determined according to the pixel data of the above group ø to the binarization circuit 10 and other binarization circuits 12, 13, 14 and 15 which will be explained later. In other words, to the average-value calculation circuit 11 of the present circuit are supplied the maximum value and the minimum value of each pixel data of the group detected by the maximum/minimum detection circuit 16 to which each pixel data of the above group is supplied. The average of these maximum and minimum values is determined as the threshold value.

On the other hand, to the first correlation degree calculation circuit 6 is supplied each pixel data of the group 1 after being binarized by the binarization circuit 12. The first correlation degree calculation circuit 6, based on the pixel data of the group ø (binarized data) and the pixel data of the group 1 (binarized data) calculates the degree of correlation between these groups. Likewise, to the second to the fourth correlation degree calculation circuits 7–9 are added pixel data of the groups 2 to 4 after being binarized at the binarization circuits 13–15. The second correlation degree calculation circuit 7 calculates the degree of correlation between the group ø and the group 2. The third correlation degree calculation circuit 8 calculates the degree of correlation between the group ø and the group 3. The fourth correlation degree calculation circuit 9 calculates the degree of correlation between the group ø and the group 4. Then, the output P (1)–P (4) calculated by each correlation degree calculation circuit is supplied to the interpolation means selection circuit 4.

The correlation degree P (N) by the correlation degree calculation circuits 7–9 in the present example is calculated by the following formula:

$$P(N)=A(\emptyset)\otimes A(N)+B(\emptyset)\otimes B(N)+C(\emptyset)\otimes C(N)+D(\emptyset)\otimes D(N)$$

(N=1, 2, 3, 4)

The operation of X $\otimes$ Y in the above formula is in accordance with the operation rule shown in the following Table:

| X | Y | X $\otimes$ Y |
|---|---|---|
| UP (1) | UP (1) | 1 |
| UP (1) | DOWN (φ) | −1 |
| DOWN (φ) | DOWN (φ) | 1 |
| DOWN (φ) | UP (1) | −1 |

The above correlation degree calculation output P (N) is supplied to the interpolation means selection circuit 4, which detects the group having the largest degree of correlation with the group ø on the basis of the above output P (N) and supplies to the first switch 5 the selection signal which selects a specified interpolation method according to the result of this detection.

The first switch 5 supplies to the second switch 17 selectively either interpolation output from each of the above interpolation circuits designated by the above selection signals.

To the second switch 17 is supplied the interpolation output from the two-dimensional interpolation circuit 3. This second switch 17, by the switching control with comparative output of the comparator 18, outputs selectively the interpolation output from the said two-dimensional interpolation circuit 3 or the interpolation output from the said first switch 5. In other words, the maximum value and the minimum value within the group detected by the above maximum/minimum value detection circuit 16 are supplied to the distribution range detection circuit 19, which calculates the difference between the maximum value and the minimum value, namely the distribution range of pixel data (e.g. contrast) and supplies it to the comparator 18.

This comparator 18 compares the distribution range (biased quantity) and a specified reference value KC and if the distribution range is larger, namely, if there is more than a specified level change of brightness and color, the interpolation output is given from the above first switch 5. If the reference value is larger, namely, if a change in the surrounding area of the interpolation pixel is small, the above second switch 17 is controlled so as to give the interpolation output from the two-dimensional interpolation circuit 3.

The reference value KC may be set variably, for example, by monitoring the interpolation output.

Figure 12:
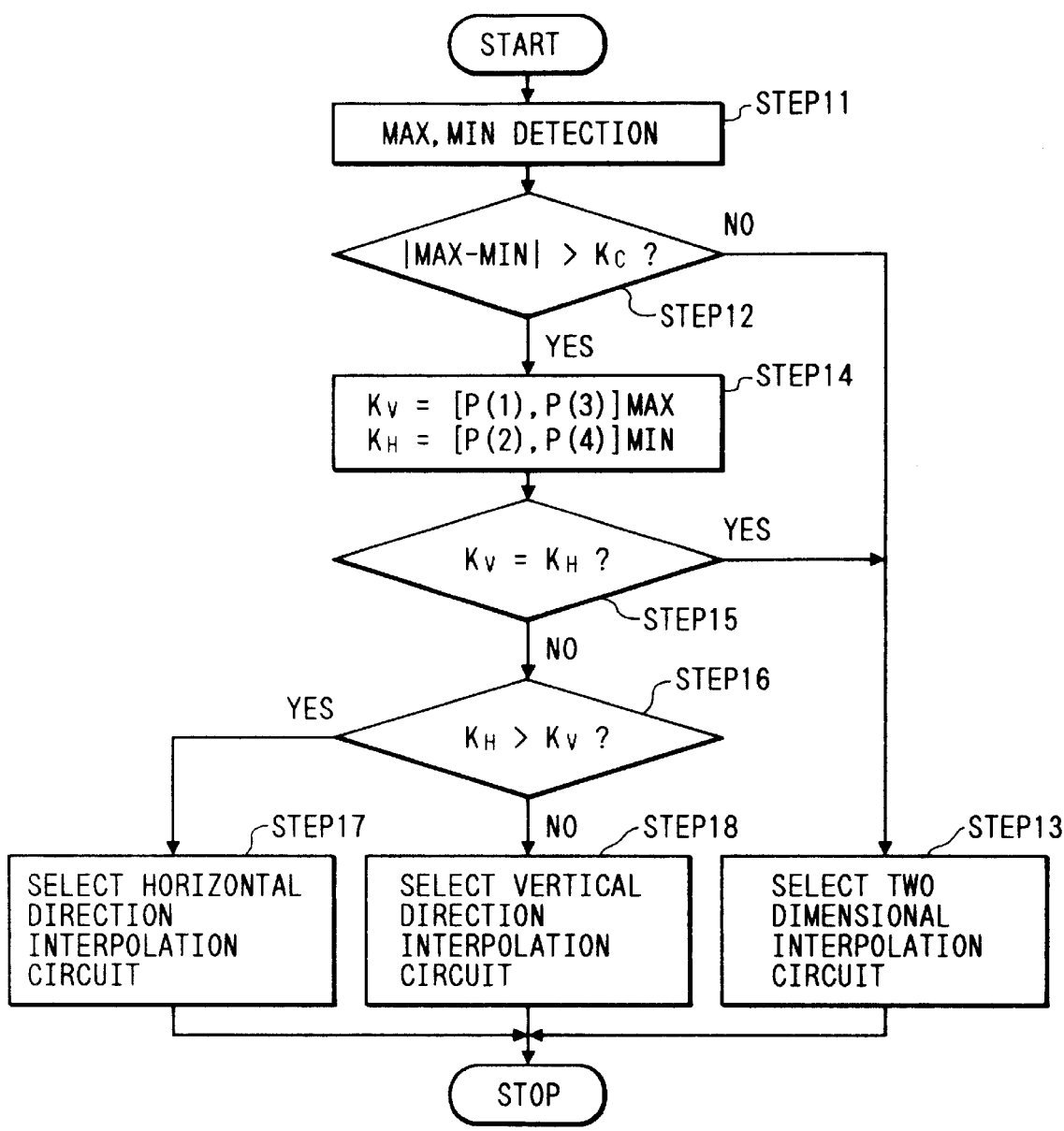
FIG. 12 is a flow chart indicating the operation of the embodiment shown in FIG. 11.

Then, to explain the operation of the interpolation apparatus of the above described structure, as shown in FIG. 12, the maximum value and the minimum value are detected from the pixel data of the group (Step 11) and the difference of these values, namely the distribution range and a specified reference value KC are compared (Step 12). In case the reference value is larger, the interpolation output of the two-dimensional interpolation circuit is given (Step 13).

On the other hand, if the distribution range is more than a specified reference value KC, out of calculation outputs P (N) at each correlation degree calculation circuit, those having large correlation degree of the horizontal direction and those having large correlation degree of the vertical direction are detected (Step 14) to judge whether these are more or less equal to each other (Step 15).

If they are equal, such selection signal is output that will give the output of the two-dimensional interpolation circuit 3 from the switch 5 with the indication that it is impossible to judge whether the pixel interpolation should be started with the pixels of the horizontal direction or of the vertical direction (Step 13).

If they are not equal, the correlation degree of the horizontal direction is compared with that of the vertical direction in size (Step 16). If the correlation degree of the horizontal direction is large, it is judged that the pixel interpolation should better be started with pixels of the horizontal direction, then such a selection signal is output that will give the output of the horizontal direction interpolation circuit 1 from the above switch 5 (Step 1'). If the correlation degree of the vertical direction is larger, it is judged that the pixel interpolation should better be started with pixels of the vertical direction, and then such a selection signal is output that will give the output of the vertical-direction interpolation circuit 2 from the said switch 5 (Step 18).

In this way, the present embodiment is such that detection is more about the degree of correlation between a group of adjacent pixels containing pixels adjacent to the interpolation pixels and a group of surrounding pixels. Consequently, it has become possible to judge accurately whether the pixel interpolation should be started with the pixels of the horizontal direction or with those of the vertical direction or whether the interpolation should be with all of the surrounding pixels.

Based on such accurate judgment, the optimum interpolation processing can be made by the selection of adjacent pixels, i.e., selection of the interpolation circuits 1–3, which are used in the operation of the interpolation pixels based on the data of adjacent pixels.

Thus, the present embodiment gives the instance in which there is a substantial lessening of the turning-back distortion resulting from the false judgment, and hence prevention of deterioration of image quality owing to the turning-back distortion.

Further, as a result of a simulation experiment by the applicant of the present patent application, it has become evident that the generation probability of false judgement in the present embodiment is extremely smaller than in the past.

In the present embodiment, by binarization of each pixel data supplied to each of the correlation degree calculation circuits, the operation processing of these circuits can be simplified, eventually leading to the speedy processing and the smaller sizing of hardware.

Also, in the embodiment, the "tendency" of changes in the surrounding area of the interpolation pixels is detected by detecting the distribution range of each pixel of the above group ø. According to the result of the detection, in case changes in the surrounding area of interpolation pixels are small, the interpolation output is given unilaterally from the said two-dimensional interpolation circuit 3 to realize the interpolation processing having few false judgments. The action to detect the "tendency" of changes in the patterns in the surrounding area of interpolation pixels and the action to detect the correlation degree may be done in parallel or in series.

Meanwhile, in the embodiment, each group comprises 4 pixels. But the present invention is not limited to this. For example, as shown in FIG. 10, each group may comprise more pixels (in this case 12 pixels) for more accurate judgment of "tendency".

In the embodiment, explanation was made about the two-dimensional offset sampling. Needless to say, the present invention may be applied to the interpolation equipment for the case of offset sampling of three-dimensional pictures such as animation.

Besides, in this embodiment, the interpolation pixels were obtained by using for operation, only 4 pixels adjacent to the interpolation pixels in the case of the interpolation circuits 1–3. Further to this, the surrounding pixels may be used for the operation.

In the embodiment, each pixel data are binarized. But the present invention is not limited to binarization. Naturally, polynumerialization is possible depending on relationship with required processing speed.

In the embodiment, the second switch 17 is provided. But the present invention is not limited to such structure. For example, the comparative output of the above comparator 18 may be supplied to the interpolation means selection circuit 4 to generate selection signals.

As is evident from the above explanation, according to the present embodiment, since the selection of optimum interpolation means from a plural number of interpolation means to calculate and interpolate pixels from signals of offset sampling is determined on the basis of pixels located in the surrounding of the interpolation pixels, it is possible to judge whether the pixel interpolation should be started with the pixels of the horizontal direction or of the vertical direction or whether the interpolation should be made with all of the surrounding pixels. Thus, according to the present invention, the generation of turning-back distortion originating from the above false judgment can be prevented, hence presention of deterioration of image quality owing to the turning-back distortion.

Also, in the present embodiment, it is possible to realize interpolation processing including less false judgement by detecting a distribution range of each pixel data level in the surrounding area of interpolation pixels and if changes are small in the surrounding area of interpolation pixels according to the result of the detection, giving unilaterally the interpolation output based on all pixel data in the surrounding area of the interpolation pixels.

Figure 13:
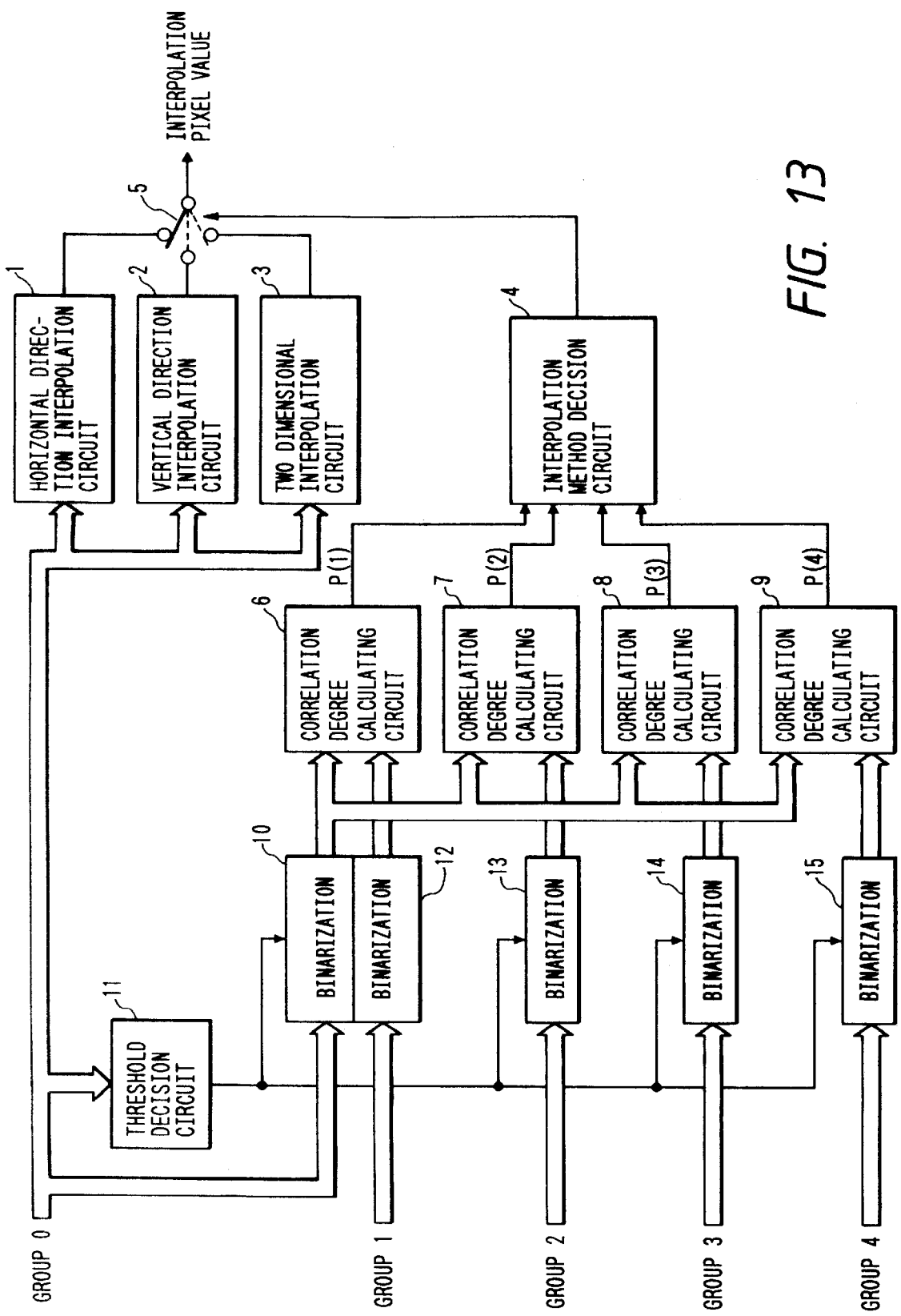
FIG. 13 is a block diagram showing the structure of the third embodiment relating to the present invention.

Next, detailed explanation is given about the third embodiment of the interpolation apparatus for the offset sampling signals relating to the present invention, using FIGS. 13 and 14.

FIG. 13 is a block diagram showing the structure of the interpolation apparatus of the present embodiment. The layout of each of the pixels used to detect the "tendency" in the surrounding area of interpolation pixels of the present embodiment is as shown in FIG. 8.

In this embodiment, the correlation between groups ø–4 is judged (detected), by using not only the group ø of adjacent pixels comprising 4 pixels A (ø)–D (ø) adjacent to the interpolation pixels in the horizontal and vertical directions but also the group of surrounding pixels comprising 4 pixels containing each pixel of the group ø, in order to detect whether the pixel interpolation should be started with the pixels of horizontal direction or with those of vertical direction or whether the interpolation should be made with all of the surrounding pixels.

In other words, each of the pixel data of the group ø having a specified bit (e.g., 12 bit) output from the A/D (analog-digital)converter not shown on the figure are supplied to a general horizontal-direction interpolation circuit 1, vertical-direction interpolation circuit 2 and two-dimensional interpolation circuit 3. In the above horizontal-direction interpolation circuit 1, based on each pixel data (A, B, C, D) of the group 1, a value for the interpolation pixels is calculated by the interpolation operation of, for example, (B+D)/2. Likewise, in the above vertical-direction interpolation circuit 2, based on each pixel data of the group ø, a value for interpolation pixel is calculated by the interpolation operation of (A+C)/2, for example. Further, in the two-dimensional interpolation circuit 3, based on each pixel data of the group ø, a value for interpolation pixel is calculated by the interpolation operation of (A+B+C+D)/4, for example.

Then, the interpolation pixel data thus obtained are supplied to the switch 5 which is controlled by the interpolation means selection circuit 4 which is explained later.

Each pixel data of the above group ø are binarized at the binarization circuit 10 and supplied to the first to fourth correlation degree calculation circuit 6, 7, 8 and 9.

Here, the binarization circuit 10 binarizes the pixel data supplied from the threshold value determination circuit 11 according to the threshold value. The threshold value determination circuit 11 determines the threshold value according to the pixel data of the group and supplies the threshold value data to the binarization circuit 10 and the other binarization circuits 12, 13, 14 and 15. In the present embodiment, the average value of all pixels data within the group ø or the average value of the maximum and the minimum values within the group ø is taken as threshold value.

On the other hand, to the first correlation degree calculation circuit 6 are supplied each pixel data of the group 1 after being binarized at the binarization circuit 12. The first correlation degree calculation circuit 6 calculates the correlation degree between the groups based on the pixel data of the group ø (binarized data) and the pixel data of the group 1 (binarized data). Likewise, to the second to the forth correlation degree calculation circuits 7–9 are supplied each pixel data of the groups 2 to 4 after being binarized at the binarization circuits 13–15. The second correlation degree calculation circuit 7 calculates the degree of correlation between the group ø and the group 2. The third correlation degree calculation circuit 8 calculates the degree of correlation between the group ø and the group 3. The fourth correlation degree. Calculation circuit 9 calculates the degree of calculation between the group ø and the group 4. Then, the calculation outputs P (1)–P (4) at the correlation degree calculation circuits are supplied to the interpolation means selection circuit 4.

The correlation degree P (N) at the above correlation degree calculation circuits 7–9 of the present embodiment is calculated on the basis of the following formula:

$$P(N)=A(\phi)\otimes A(N)+B(\phi)\otimes B(N)+C(\phi)\otimes C(N)+D(\phi)\otimes D(N)$$

(N=1, 2, 3, 4)

The operation X $\otimes$ Y in the above formula is in accordance with the rules shown in the following table.

| X | Y | X $\otimes$ Y |
|---|---|---|
| UP (1) | UP (1) | 1 |
| UP (1) | DOWN (φ) | −1 |
| DOWN (φ) | DOWN (φ) | 1 |
| DOWN (φ) | UP (1) | −1 |

The correlation degree calculation output P (N) as mentioned above is supplied to the interpolation means selection circuit 4, which, based on the above output P (N), detects the group having the largest correlation degree with the group ø. Based on the results of this detection, a signal which selects a specified interpolation method is output. Namely, as shown in FIG. 14, out of the calculation output P (N), those having high correlation degree of the horizontal direction of the vertical direction are detected respectively and those having high correlation degree (Step 21) to judge whether they are equal to each other or not (Step 22).

If they are equal, such a selection signal that gives outputs from the two-dimensional interpolation circuit 3 to the switch 5 is output, with the understanding that it is impossible to judge whether the pixel interpolation should be executed with pixels of the horizontal direction or of the vertical direction (Step 23).

If they are not equal, difference in size between the correlation degree of the horizontal direction and that of the vertical direction is judged (Step 24). If the correlation degree of the horizontal direction is larger, with the judgment that the pixel interpolation should be started with pixels of the horizontal direction such selection signal that will give the output from the horizontal-direction interpolation circuit 1 to the above switch 5 is output (Step 25). If the correlation degree of the vertical direction is larger, with the judgment that the pixel interpolation should be started with the pixels of the vertical direction, such a selection signal that will give the output from the above vertical-direction interpolation circuit 2 to the switch 5 is output (Step 26).

In this way, in the embodiment, it becomes possible to judge accurately whether the pixel interpolation should be made with pixels of the horizontal direction or of the vertical direction or whether the interpolation should be made with all of the surrounding pixels, since the correlation degree between the group of adjacent pixels containing pixels adjacent to the interpolation pixels and the group of the surrounding pixels can be calculated.

Based on the result of such accurate judgment, the optimum interpolation processing can be done by selecting adjacent pixels used in the operation of interpolation pixels from the adjacent pixels data, namely selecting the interpolation circuits 1–3.

Thus, this embodiment allows the virtual elimination of turning-back distortion originating from the above false judgment, and hence prevention of deterioration of an image quality owing to the turning-back distortion.

According to the result of the simulation experiment conducted by the applicant of the present patent application, it has become evident that the generation probability of false judgment in the present embodiment becomes extremely remote as compared with the past.

Furthermore, in this embodiment, by the binarization of each pixel data supplied to the above correlation degree calculation circuits, the operation processing at the circuits is simplified, leading ultimately to the speedy processing and a smaller sizing of hardware.

Meanwhile, the embodiment explained the structure of 4 pixels for each group. More accurate judgment can be made also by the use of more pixels for each group (in this case, 12 pixels) as shown in FIG. 10.

In the embodiment, explanation was made about the two-dimensional offset sampling. Naturally, the present invention may be applied to the interpolation equipment for the offset sampling of three-dimensional pictures such as animation.

Also, in the embodiment, the interpolation pixels for each of the interpolation circuits 1–3 were obtained by using in the operation only adjacent pixels of the interpolation pixels. But surrounding pixels can further be used in this operation.

Furthermore, in the embodiment, each pixel data were binarized. But the present invention is not limited to the binarization and, needless to say, polynumerization (n-numerization) may be made depending on required processing speed. If the n value becomes larger, the more accurate is the detection of correlation degree.

As is evident from the above explanation, according to the present invention, the selection of the optimum interpolation means for a plural number of interpolation means which calculates interpolation pixels from the signals of offset sampling is determined on the basis of correlation degree of pixel group comprising pixels located in the surrounding area of the interpolation pixels. For this reason, it is possible to judge accurately whether the pixel interpolation should be started with pixels of the horizontal direction or of the vertical direction or whether the interpolation should be with all of the surrounding pixels.

According to the present invention, it is possible to present the generation of turning-back distortion resulting from false judgment of the "tendency" in the surrounding of the above interpolation pixels, and hence the prevention of deterioration of picture quality owing to turning-back distortion.

In the present invention, each pixel data is n-valued, and based on the data, the correlation degree is calculated to simplify the operation processing for the calculation of the correlation degree, ultimately leading to the speedy processing and smaller sizing of hardware.

What is claimed is:

1. An image processing apparatus comprising:
    input means for inputting an image signal consisting of a plurality of pixels;
    forming means for forming a plurality of units, each of the plurality of units consisting of a plurality of pixels;
    correlation detecting means for detecting degree of correlation between the plurality of units formed by said forming means; and
    interpolating means for interpolating the image signal input by said input means according to the detecting result of said correlation detecting means.

2. An apparatus according to claim 1, wherein the pixels are arranged in a manner of an offset sampling arrangement.

3. An apparatus according to claim 1, wherein said interpolation means performs a horizontal directional interpolation or a vertical directional interpolation or a two-dimensional interpolation.

4. An apparatus according to claim 1, wherein one of said plurality of units comprises four pixels located in the horizontal direction and in the vertical direction from the interpolation pixel between them and each of the other units comprises four pixels containing one pixel of said pixel group.

5. An apparatus according to claim 2, further comprising control means for controlling said interpolation means so as to perform the interpolation in the horizontal direction when an output of said correlation detection means indicates that correlation in the horizontal direction is larger and perform the interpolation in the vertical direction when the output of said correlation detection means indicates that the correlation in the vertical direction is larger.

6. An apparatus according to claim 1, wherein said interpolation means generates interpolation data for interpolation of the thinned-out pixel data.

7. An image processor for interpolating pixel data, comprising:
    forming means for forming a plurality of units, each of the plurality of units consisting of a plurality of pixels of an input image signal which consists of a plurality of pixels;
    an interpolator for interpolating the input image signal, said interpolator applying a plurality of interpolation methods different from each other;
    a correlation detector for detecting degree of correlation between a predetermined unit formed by said forming means and each of a plurality of other units formed by said forming means, the predetermined unit consisting of a plurality of pixels surrounding a pixel to be interpolated by said interpolator, each of the plurality of other units consisting of a plurality of pixels surrounding the predetermined unit; and
    a controller for setting the interpolation method of the interpolator according to the detecting result of the correlation detector.

8. An image processor according to claim 7, wherein said plurality of other units are in the same picture as said predetermined unit of pixels.

9. An image processor according to claim 7, wherein said interpolator can perform interpolation in the horizontal direction, interpolation in the vertical direction and interpolation in two dimensional directions.

10. An image processor according to claim 7, wherein said controller includes a correlation detection circuit for detecting the degree of correlation between said predetermined unit of pixels and each of said plurality of other units of pixels.

11. An image processor according to claim 8, wherein said controller controls said interpolator so as to perform interpolation in the horizontal direction when an output of said correlation detection circuit indicates that the correlation in the horizontal direction is larger and perform the interpolation in the vertical direction when the output of said correlation detection circuit indicates that the correlation in the vertical direction is larger.

12. An image processor according to claim 7, wherein said controller changes the interpolation method of said interpolator according to a distribution range of levels of the plurality of pixels surrounding the pixel data to be interpolated by said interpolator.

13. An image processor according to claim 7, wherein said controller detects a degree of correlation between said predetermined unit of pixels and each of said plurality of other units of pixels on the basis of each of n-valued pixel data of the units of pixels, including said predetermined unit of pixels and said plurality of other units of pixels.

14. An image processing apparatus, comprising:
    forming means for forming a plurality of units, each of the plurality of units consisting of a plurality of pixels of an input image signal which consists of a plurality of pixels;
    interpolating means for interpolating thinned-out pixel of an image signal consisting of a plurality of pixels;
    correlation detecting means for detecting degree of correlation between the plurality of units each of which comprises a plurality of pixels surrounding the thinned-out pixel to be interpolated by said interpolating means; and
    control means for setting the interpolation method of the interpolating means according to the detecting result of said correlation detecting means.

15. An apparatus according to claim 14, wherein said interpolating means can perform interpolation in the horizontal direction, interpolation in the vertical direction and interpolation in two dimensional directions.

16. An apparatus according to claim 14, wherein said controlling means includes a correlation detection circuit for detecting the degree of the correlation between said plurality of units.

17. An apparatus according to claim 16, wherein said controlling means controls said interpolating means so as to perform interpolation in the horizontal direction when an output of said correlation detection circuit indicates that the correlation in the horizontal direction is larger and perform the interpolation in the vertical direction when the output of said correlation detection circuit indicates that the correlation in the vertical direction is larger.

18. An apparatus according to claim 1, wherein said interpolating means interpolates the image signal by selectively using a plurality of different interpolation methods.

19. An apparatus according to claim 1, wherein each of the plurality of units comprises a plurality of pixels located in the surrounding area of a pixel of the image signal to be interpolated by said interpolating means and the plurality of pixels comprised in the respective plurality of units being different from each other.

20. An image processing method comprising steps of:
inputting an image signal consisting of a plurality of pixels;
forming a plurality of units, each of the plurality of units consisting of a plurality of pixels;
detecting degree of correlation between the plurality of units formed by said forming step; and
interpolating the image signal input by said input step according to the detecting result of said detection step.

21. A method according to claim 20, wherein pixels are arranged in a manner of an offset sampling arrangement.

22. A method according to claim 20, wherein in said interpolation step, a horizontal directional interpolation or a vertical directional interpolation or a two-dimensional interpolation is performed.

23. A method according to claim 20, wherein one of said plurality of units comprises four pixels located in the horizontal direction and in the vertical direction from the interpolation pixel between them and each of the other units comprises four pixels containing one pixel of said pixel group.

24. A method according to claim 21, further comprising a step of controlling said interpolation step so as to perform the interpolation in the horizontal direction when the detecting step indicates that correlation in the horizontal direction is larger and perform the interpolation in the vertical direction when the detecting result of said detecting step indicates that the correlation in the vertical direction is larger.

25. A method according to claim 20, wherein in said interpolating step, interpolation data for interpolation of the thinned-out pixel data is generated.

26. A method according to claim 20, wherein in said interpolating step, the image signal is interpolated by selectively using a plurality of different interpolation methods.

27. A method according to claim 20, wherein each of the plurality of units comprises a plurality of pixels located in the surrounding area of a pixel of the image signal to be interpolated by said interpolating step and the plurality of pixels comprised in the respective plurality of units being different from each other.

28. An image processing apparatus which performs comparison of a plurality of pixels of an input image signal comprising said plurality of pixels to detect degree of correlation between said plurality of pixels by a correlation detection circuit and interpolates the input image signal according to the detecting result by an interpolation circuit, wherein the comparison of pixels by said correlation detection circuit is performed using pixel groups each of which comprises a plurality of pixels.

29. An apparatus according to claim 28, wherein the plurality of pixel groups are compared with each other to detect the degree of correlation between the plurality of pixel groups.

30. An apparatus according to claim 29, wherein the pixel group comprises a plurality of pixels surrounding the image signal to be interpolated.

31. An apparatus according to claim 28, wherein the input image signal is interpolated by selectively using a plurality of different interpolation methods according to the detecting result.

32. An apparatus according to claim 28, wherein the input image signal is a sampled image signal and the interpolation is performed on the sampled image signal.

33. An apparatus according to claim 28, wherein the degree of correlation is represented by binary value.

* * * * *